Patented Feb. 12, 1924.                                                    1,483,797

UNITED STATES PATENT OFFICE.

ARTHUR G. GREEN AND KENNETH H. SAUNDERS, OF MANCHESTER, ENGLAND, ASSIGNORS TO BRITISH DYESTUFFS CORPORATION LIMITED, OF MANCHESTER, ENGLAND.

DYEING AND PRINTING ACETYL SILK AND MATERIALS CONTAINING IT.

No Drawing.        Application filed March 20, 1923. Serial No. 626,425.

*To all whom it may concern:*

Be it known that we, ARTHUR GEORGE GREEN and KENNETH HERBERT SAUNDERS, subjects of the King of England, and residents of Manchester, in the county of Lancashire, England, have invented certain new and useful Improvements in Dyeing and Printing Acetyl Silk and Materials Containing It, of which the following is a specification.

The dyeing or printing of the variety of artificial silk known as "acetyl silk" or "acetate silk" has hitherto presented considerable difficulties. Those dyestuffs which are readily soluble in water and contain strong salt forming groups, such as sodium salts of sulphonic acids or hydrochlorides of strong colour bases, possess for the most part but little affinity for this fibre and even when the latter becomes coloured, the dyestuff can usually be readily removed by soap.

We have now discovered a new method by means of which shades fast to soap and washing can be produced upon this fibre with easily soluble compounds and which further allows of the production of remarkable differential effects with mixed materials containing cotton, wool, linen etc., in combination with acetyl silk. This method can be used in dyeing and in printing; that is, in localized dyeing.

This new method is based on the fact that when the methyl-omega-sulphonic acids derived from amido-azo compounds are treated in hot aqueous solution especially if it be slightly acid or slightly alkaline they slowly dissociate with liberation of free amido-azo bases. We have found that if this is made to occur in the dyebath in presence of acetyl-silk, this fibre takes up the sparingly soluble amido-azo compound as it is produced and becomes dyed therewith yellow, orange, red, etc. Furthermore, the amido-azo compounds thus fixed on the acetyl silk are capable of being diazotized upon treatment with nitrous acid and then can be developed like primuline with various phenols, amines and amidophenols, giving a wide range of shades including, for instance, yellow, orange, red and purple to black.

The methyl-omega-sulphonic acids which we employ for this new method of dyeing, are azo compounds containing the group $NH.CH_2.SO_3H$ once or twice in the molecule. No sulphonic group directly attached to the nucleus should be present. The omega-methyl-sulphonic group attached by means of nitrogen to the benzene or naphthalene residue of the amido-azo compound renders the dyestuff soluble in water but is split off in the dyeing process. Such dyestuffs may be obtained, for example, by treating an amido-azo compound with formaldehyde-bisulphite, or by coupling an unsulphonated diazo compound with a methyl-omega-sulphonic acid derived from a primary amine of the benzene or naphthalene series produced by treatment of the latter with formaldehyde and bisulphite; or by sulphide reduction of a para-nitro-derivative of such an amido-azo-methyl-omega-sulphonic acid. Also by coupling an unsulphonated amine or phenol with the diazo compound derived from a diamine, one amido group of which has been converted into its methyl-omega-sulphonic acid derivative by treatment with formaldehyde and bisulphite.

In addition to these methyl-omega-sulphonic acids which are derived from primary amido-azo colouring matters those derived from mono-alkyl-amido-azo bases may also be used for the dyeing of acetyl silk and the production of differential effects in dyeing mixed materials containing cotton, wool, linen etc., in combination with acetyl silk. These latter dyestuffs so long as they do not also contain a primary amido group (or a second methyl-omega-sulphonic radicle united to a primary amido group) are insusceptible to diazotization. They can, therefore, be used for giving their own shade to acetyl silk or employed for shading other dyes.

Those secondary dyestuffs which in addition to the methyl-omega-sulphonic radicle attached to the algyl amido group also contain a primary amido group or a second methyl-omega-sulphonic radicle attached to a primary amido group, are, like the primary dyestuffs, capable of being diazotized and developed on the acetyl silk fibre. They can, therefore, be employed in dyeing in the manner described for the primary alkyl-omega-sulfonic acid dyes.

Compounds of the non-diazotizable type are obtained, for example, by coupling unsulphonated diazo compounds with the reaction products of sodium formaldehyde bisulphite upon monomethyl- or monoethyl-aniline. Compounds of the diazotizable type may be obtained, for example, by sulphide reduction of the compounds obtained by coupling para-nitrodiazo-benzene chloride with the reaction products of sodium formaldehyde bisulphite upon monomethyl- or monoethyl-aniline.

In addition to the above described methyl-omega-sulphonic acids, other analogous omega sulphonic acids, derived from primary or secondary amido azo compounds may be used for the dyeing of acetyl silk and of union or mixed fabrics containing acetyl silk. The said compounds are obtained in the same methods as those employed in preparing the bodies, the use of which is already claimed, except that other aldehydes are employed in place of formaldehyde in their preparation.

For the most part these dyestuffs have a smaller degree of stability to acids and alkalies than the methyl-omega-sulphonic acids. In some cases this may be an advantage in enabling dyeing to be effected at a lower temperature or in a neutral bath.

The dyestuffs of the present invention which contain only one azo group, though dyeing acetyl silk, have little or no affinity for cotton and linen. From a bath containing these dyestuffs therefore a mixed fabric will be selectively dyed, and if a mixture of dyestuffs consisting of one of the said dyestuffs together with a dyestuff having an affinity for cotton but little affinity for acetyl silk be used, the acetyl silk fibres will be dyed by the acetyl silk dye, whilst the cotton is dyed by the cotton dyestuff. If the cotton dyestuff is also diazotizable, both the colour upon the cotton and that upon the acetyl silk can be developed in different or similar colours according to the choice made of dyestuffs and developers. Furthermore, differential colouring can be obtained by making use of the varying rate of development, the diazo colour upon the cotton being developed, for example with β-naphthol, much more rapidly than the acetyl silk dye upon the silk. It is thus possible to develop the former with one developer. As the present dyestuffs can be dyed upon acetyl silk from a neutral, acid or alkaline bath, conditions of dyeing can be chosen which are most suitable for the fixation of the other dyestuff upon the cotton, linen or animal fibre.

Since other forms of artificial silk such as viscose silk, behave towards dyestuffs for the most part like cotton, two colour effects such as "shots" can be produced upon mixed fabrics containing both viscose silk and acetyl silk by making use of the same methods as above.

Further, all the above described dyestuffs can be conveniently employed in printing for producing coloured patterns upon cloth consisting either entirely or partially of acetate silk.

When a thickened solution of an alkyl-omega sulfonic acid dyestuff, preferably rendered slightly acid with an organic acid, is printed upon such a cloth, and after drying is steamed, the acetate silk fibres become coloured. If cotton, or other pure cellulose fibre, is also present this will be left white when the material is washed. When the alkyl-omega sulfonic acid dyestuff used is a "primary" one i. e. is derived from a primary amido-azo compound, the colour produced upon the silk may be converted into other shades by subsequent diazotization and development, employing the same methods as are herein before described for the dyeing of acetate silk.

Patterns in two colours may be produced with figured material composed of acetate silk woven with cotton, linen or viscose silk, by printing upon such material a thickened paste composed of an alkyl-omega sulfonic acid dyestuff together with a direct cotton colour, the paste being preferably neutral or slightly alkaline. After printing the material is dried, given a short steaming and then washed or soaped. The color is fixed upon the acetate silk whilst the direct cotton colour is fixed upon the cotton, linen or viscose silk.

Three or four colour patterns can be produced upon figured materials of acetate silk and cotton, etc., by first printing the material as above with an alkyl-omega-sulfonic acid dyestuff in conjunction with a direct cotton colour or alternatively dyeing it with such a mixture in the manner herein before described, and subsequently cover-printing with a suitable basic dyestuff, with which a discharging agent such as formosol may or may not be associated.

The following examples will serve to illustrate further the nature of this invention but the invention is not limited thereto:—

*Example 1.*

Acetyl silk yarn is dyed for an hour at 60° to 80° C. in a bath containing 1 per cent of a dyestuff of the constitution:—

which is obtained by heating unsymm-dimethyl-di-p-amido-azobenzene with sodium bisulphite-formaldehyde. The bath is preferably acidified with 1 per cent of concentrated hydrochloric acid or rendered alkaline with 1 per cent of soda ash. After washing off in dilute ammonia the silk is dyed a bright yellow.

Example 2.

The yellow dyed silk obtained in the previous example is diazotized by immersion for 15 minutes in a cold bath containing— 3 parts of sodium nitrite and 10 parts of concentrated hydrochloric acid per 1000 parts of water. The colour changes to dark blue. After rinsing in water the silk is brought into a developing bath, preferably warm, when the following colours are produced according to the developer chosen:—

With dimethylaniline _____Red.
" acetoacetic ether_____Orange.
" m-amidophenol _____Bluish-red.
" m-phenylene diamine_____Maroon.
" amidonaphthol (1: 7)__Dark purple.
" β-naphthylamine _____Bluish-red.
" α-naphthylamine ether_____
    Purple to black.
" phenol _____Orange-brown.
" β-naphthol _____Purple.
" β-oxynaphthoic acid_____
    Navy blue to black.

The silk is allowed to remain in the developing bath from 10 to 30 minutes and is then washed.

Example 3.

Acetyl silk yarn is dyed as in Example 1 but using a dyestuff of the constitution:—

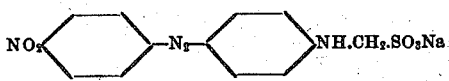

which is obtained by coupling diazotized para-nitraniline with aniline-methyl-omega-sulphonic acid. The silk acquires a bright orange shade.

Example 4.

The orange dyed silk obtained in the previous example is diazotized by immersion for fifteen minutes in a nitrous acid bath made up as in Example 2.

After rinsing in water the silk is then brought into a developing bath, when the following colours are produced according to the developer used:—

Resorcin _____Orange.
Acetoacetic ether _____Yellow.
β-naphthol _____Bright-red.
α-naphthol _____Bluish-red.
m-amidophenol _____Red.
Amidonaphthol (1: 7)_____Purple.
β-naphthylamine _____Maroon.
α-naphthylamine ether _____Dark brown.
m-phenylene diamine _____Dark red.

These developers are used in about 0.5 per cent to 1 per cent solution, and the silk is allowed to remain in the bath for ½ hour.

Example 5.

Mercerized cotton cloth containing "effect threads" of acetyl silk, or hosiery consisting partly of cotton and partly of acetyl silk is dyed at 60° to 80° C. in a bath containing a mixture of chlorazol black BH and the dyestuff mentioned in Example 3; 10 per cent of salt and 1 per cent of soda ash are also added. After dyeing and rinsing, the material is immersed in a nitrous acid bath made up as described in Example 2, and then, after washing, in a developing bath consisting of sodium β-naphtholate. The cotton is dyed dark navy blue whilst the silk becomes bright red.

If in place of the β-naphtholate the developer employed is a solution of 1:7 amidonaphthol a dark purple is produced upon the silk whilst the cotton is black.

Example 6.

Cotton cloth embroidered with acetyl silk is dyed at 60°-80° C. from a bath containing a mixture of primuline and the dyestuff mentioned in Example 1; 5 per cent of salt and 1 per cent of soda ash being also added. The entire material will now be yellow, the cotton having been dyed by the primuline and the acetyl silk by the other dyestuff. Upon immersion in a nitrous acid bath, made up as described in Example 2, both dyestuffs are diazotized, the primuline changing to a reddish-yellow and the other dyestuff to dark blue.

The material is now immersed for one minute in a developing bath of sodium-β-naphtholate when the primuline becomes red, the new dyestuff remaining unchanged. After again rinsing to remove the excess of β-naphtholate, the material is immersed for half-an-hour in a bath of α-naphthylamine ether, $C_{10}H_6(OC_2H_5)NH_2(2:1)$, and then washed. By this process the silk becomes black whilst the cotton remains red.

If α-naphthylamine ether is used for the first developer and resorcin for the second, an orange silk pattern is obtained upon a blue cotton ground.

Example 7.

Acetyl silk yarn is dyed for an hour at about 70-75° C. from a bath containing 1 per cent of a dyestuff of the formula

which is obtained by coupling diazotized metanitraniline with dimethylaniline-omega-sulphonic acid (from monomethylaniline and sodium formaldehyde bisulphite). The bath is preferably acidified with 1 per cent of formic acid or rendered alkaline with 1 per cent of soda ash. After washing off, the silk is dyed a bright yellow.

*Example 8.*

A fabric containing acetyl silk is dyed as in the previous example, but using a dyestuff of the constitution:—

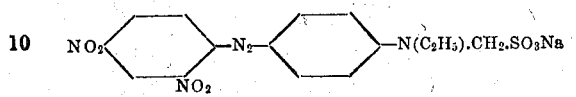

which is obtained by coupling diazotized dinitraniline with ethyl-aniline-methyl-omega-sulphonic acid (from monoethylaniline and sodium formaldehyde bisulphite). The acetyl silk is dyed crimson red.

*Example 9.*

Acetyl silk yarn is dyed at 50° to 60° C. in a bath containing 1 per cent of the compound of the constitution:—

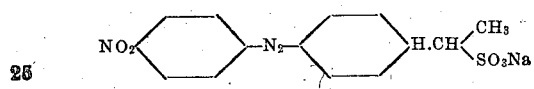

which is obtainable by combining diazotized para-nitraniline with aniline-ethyl-omega-sulphonic acid, $C_6H_5.NH.CH(CH_3).SO_3H$. The bath may be employed neutral or rendered slightly alkaline or slightly acid. The silk acquires a bright orange shade.

Upon diazotization and development it gives the same range of shades as described in Example 4.

*Example 10.*

Acetyl silk yarn is dyed at 50° to 60° C. in a bath containing 1 per cent of the compound of the constitution:—

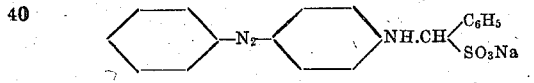

which may be obtained by reacting upon amido-azo benzene first with benzaldehyde and then with sodium bisulphite. The bath may be employed neutral or rendered slightly alkaline or slightly acid. The silk acquires a yellow shade which upon diazotization and development is converted into the following colours:—

With dimethylaniline_____ Bright scarlet.
" phenol_____ Orange yellow.
" resorcin_____ Orange brown.
" β-naphthol_____ Ponceau.
" β-oxynaphthoic acid__ Bluish red.

Now what we claim is:—

1. In the dyeing, including printing, of acetyl cellulose, the process which comprises rendering an amido-azo dye soluble in water by a treatment of such dye with an aldehyde and a bisulfite and breaking up the new soluble combination so formed in the presence of the acetyl cellulose to be dyed.

2. The process of dyeing—including printing—acetyl silk with an alkyl-omega-sulphonic acid, derived from an amido-azo compound, by treating the acetyl silk with the dyestuff in hot aqueous solution, whereby an aldehyde bisulphite compound is split off and the amido-azo compound is fixed on the fibre, substantially as described.

3. The process of dyeing—including printing—acetyl silk with an alkyl-omega sulphonic acid, derived from a primary amido-azo compound, by treating the acetyl silk with the dyestuff in hot aqueous solution, whereby an aldehyde bisulphite compound is split off and the amido-azo compound is fixed on the fibre, substantially as described.

4. The process of dyeing—including printing—acetyl silk with an alkyl-omega sulphonic acid, derived from an amido-azo compound, by treating the acetyl silk with the dyestuff in hot aqueous solution, whereby an aldehyde bisulphite compound is split off and the amido azo compound is fixed on the fibre, then diazotizing the amido-azo compound and treating with a developer, substantially as described.

5. The process of dyeing—including printing—acetyl silk with an alkyl-omega sulphonic acid, derived from a primary amido-azo compound, by treating the acetyl silk with the dyestuff in hot aqueous solution, whereby an aldehyde bisulphite compound is split off and the amido-azo compound is fixed on the fibre, then diazotizing the amido-azo compound and treating with a developer, substantially as described.

6. The process of dyeing—including printing—material containing acetyl silk with an alkyl-omega sulphonic acid, derived from an amido-azo compound, by treating the fibre or fabric with the dyestuff in hot aqueous solution, whereby an aldehyde bisulphite compound is split off and the amido-azo compound is fixed on the acetyl silk, substantially as described.

7. The process of dyeing—including printing—material containing acetyl silk with an alkyl-omega sulphonic acid, derived from a primary amido-azo compound, by treating the fibre or fabric with the dyestuff in hot aqueous solution, whereby an aldehyde bisulphite compound is split off and the amido-azo compound is fixed on the acetyl silk, substantially as described.

8. The process of dyeing—including printing—material containing acetyl silk with an alkyl-omega sulphonic acid, derived from an amido-azo compound, by treating the fibre or fabric with the dyestuff in hot aqueous solution, whereby an aldehyde bisulphite compound is split off and the amido-azo compound is fixed on the acetyl silk, then diazotizing the amido-azo compound and treating with a developer, substantially as described.

9. The process of dyeing—including printing—material containing acetyl silk with an alkyl-omega sulphonic acid, derived from a primary amido-azo compound, by treating the fibre or fabric with the dyestuff in hot aqueous solution, whereby an aldehyde bisulphite compound is split off and the amido-azo compound is fixed on the acetyl silk, then diazotizing the amido-azo compound and treating with a developer, substantially as described.

10. The process of dyeing—including printing—material containing acetyl silk and other fibers, with a mixture of an alkyl-omega sulphonic acid—derived from an amido-azo compound—and another dyestuff whereby the amido-azo compound is fixed on the acetyl silk, and the other dyestuff on the admixed fibre, substantially as described.

11. The process of dyeing—including printing—material containing acetyl silk and other fibers, with a mixture of an alkyl-omega sulphonic acid—derived from an amido-azo compound—and another dyestuff whereby the amido-azo compound is fixed on the acetyl silk, and the other dyestuff on the admixed fibre, then diazotizing and treating with a developer, substantially as described.

In testimony whereof, we have hereunto affixed our signatures.

ARTHUR G. GREEN.
KENNETH H. SAUNDERS.